United States Patent
Annen et al.

(10) Patent No.: US 10,234,841 B2
(45) Date of Patent: Mar. 19, 2019

(54) PROGRAMMABLE LOGIC CONTROLLER, SLAVE DEVICE, AND DUPLEX SYSTEM

(71) Applicant: Mitsubishi Electric Corporation, Tokyo (JP)

(72) Inventors: Katsuhiro Annen, Aichi (JP); Katsumi Yamagiwa, Aichi (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/551,427

(22) PCT Filed: Apr. 22, 2015

(86) PCT No.: PCT/JP2015/062236
§ 371 (c)(1),
(2) Date: Aug. 16, 2017

(87) PCT Pub. No.: WO2016/170614
PCT Pub. Date: Oct. 27, 2016

(65) Prior Publication Data
US 2018/0039248 A1  Feb. 8, 2018

(51) Int. Cl.
*G05B 19/05* (2006.01)
*G06F 11/20* (2006.01)
(Continued)

(52) U.S. Cl.
CPC .............. *G05B 19/05* (2013.01); *G06F 11/20* (2013.01); *G06F 11/3013* (2013.01); *G06F 11/3409* (2013.01); *G05B 2219/1215* (2013.01)

(58) Field of Classification Search
CPC .. G05B 19/05; G06F 11/3013; G06F 11/3409
See application file for complete search history.

(56) References Cited

U.S. PATENT DOCUMENTS

| 5,777,874 A | 7/1998 | Flood et al. |
| 8,060,769 B2 | 11/2011 | Yajima et al. |

(Continued)

FOREIGN PATENT DOCUMENTS

| CN | 101609421 A | 12/2009 |
| JP | 61-221941 A | 10/1986 |

(Continued)

OTHER PUBLICATIONS

Communication dated Dec. 19, 2017, from Korean Intellectual Property Office in counterpart application No. 10-2017-7030838.

(Continued)

*Primary Examiner* — Jamal Javaid
(74) *Attorney, Agent, or Firm* — Sughrue Mion, PLLC; Richard C. Turner

(57) ABSTRACT

A programmable logic controller includes a state monitoring unit to monitor a state of another programmable logic controller that is a counterpart in the duplication, and a system switching control unit to transmit, to a slave device, status information including information indicating whether the programmable logic controller is a control system or a standby system, to receive the control data that is addressed to the programmable logic controller that is the control system and is transmitted from the slave device in a case where the programmable logic controller is the control system, and to switch the programmable logic controller to the control system when hindrance in the another programmable logic controller is detected in a case where the programmable logic controller is the standby system.

3 Claims, 6 Drawing Sheets

(51) Int. Cl.
*G06F 11/30* (2006.01)
*G06F 11/34* (2006.01)

(56) References Cited

U.S. PATENT DOCUMENTS

2009/0319756 A1* 12/2009 Shimizu ............. G06F 11/2028
 712/30
2015/0205618 A1* 7/2015 Bailey ................... G06F 9/4411
 709/222

FOREIGN PATENT DOCUMENTS

| JP | 01-106637 A | 4/1989 |
|---|---|---|
| JP | H09-307574 A | 11/1997 |
| JP | 2002-149203 A | 5/2002 |
| JP | 2002-240713 A | 8/2002 |
| JP | 2006-060704 A | 3/2006 |
| JP | 2010-028712 A | 2/2010 |
| JP | 2010-182104 A | 8/2010 |
| JP | 2011-227597 A | 11/2011 |
| JP | 2012-003353 A | 1/2012 |
| WO | 2014/147773 A1 | 9/2014 |

OTHER PUBLICATIONS

Communication dated May 21, 2018 from the State Intellectual Property Office of the P.R.C. in counterpart application No. 201580079034.7.
Japanese Office Action of JP 2016-556913 dated Nov. 22, 2016.
International Search Report for PCT/JP2015/062236 dated Aug. 4, 2015.
Communication dated Mar. 29, 2018 from German Patent and Trademark Office in counterpart application No. 112015006264.5.

* cited by examiner

PROGRAMMABLE LOGIC CONTROLLER, SLAVE DEVICE, AND DUPLEX SYSTEM

CROSS REFERENCE TO RELATED APPLICATIONS

This application is a National Stage of International Application No. PCT/JP2015/062236 filed Apr. 22, 2015, the contents of all of which are incorporated herein by reference in their entirety.

FIELD

The present invention relates to a programmable logic controller that is a master station that controls a slave station by using data received from the slave station, a slave device that is a slave station, and a duplex system.

BACKGROUND

There is a known conventional method in which a programmable logic controller is duplicated to improve reliability, with one of the duplicate programmable logic controllers functioning as a control system and the other functioning as a standby system.

With a duplex system in which a programmable logic controller is a master station that controls a slave station, in order for the programmable logic controller that has been switched from the standby system to the control system to continue controlling the slave station, the programmable logic controller that has been switched from the standby system to the control system needs to control the slave station by using the same data as the data that the programmable logic controller that was the control system received from the slave station.

One known method for causing a programmable logic controller that is the standby system to hold the same data as the control system is to transmit the same data from the slave station to the control system and the standby system. In addition, Patent Literature 1 discloses a method for periodically transferring data from the control system to the standby system.

CITATION LIST

Patent Literature

Patent Literature 1: Japanese Patent Application Laid-open No. S61-221941

SUMMARY

Technical Problem

However, with the method for causing the programmable logic controller that is the standby system to hold the same data as the control system, at the point in time when switching of the systems occurs, the data received from the slave station and held by the programmable logic controller that has been switched to the control system may be older than the data received from the slave station and held by the programmable logic controller that is no longer the control system. That is, when switching of the control system and the standby system occurs, there is a problem in that the programmable logic controller that has been switched to the control system may use old data to control the slave station.

In addition, with the method disclosed in Patent Literature 1, even when a slave station is normally controlled by a control system programmable logic controller that is a master station, processing for transferring data from the control system to the standby system is still necessary. Therefore, there is a problem in that the processing load of the programmable logic controller that is the control system increases and thus the scan time increases.

The present invention has been achieved in view of the above, and an object of the present invention is to obtain a programmable logic controller that prevents a slave station from being controlled by using old data when the programmable logic controller is switched from a standby system to a control system without increasing the processing load of the control system in a case where the programmable logic controller is a master station that controls the slave station.

Solution to Problem

In order to solve the above problems and achieve the object, an aspect of the present invention is a programmable logic controller that is a duplicate of another programmable logic controller and that controls a slave device by using control data received from the slave device when the programmable logic controller is a control system. The programmable logic controller includes a state monitoring unit to monitor a state of the another programmable logic controller that is a counterpart in a duplication; and a system switching control unit to transmit, to the slave device, status information including information indicating whether the programmable logic controller is the control system or a standby system, to receive the control data that is addressed to the programmable logic controller that is the control system and is transmitted from the slave device in a case where the programmable logic controller is the control system, and to switch the programmable logic controller to the control system when hindrance in the another programmable logic controller is detected in a case where the programmable logic controller is the standby system.

Advantageous Effects of Invention

A programmable logic controller according to the present invention has an effect capable of preventing a slave station from being controlled by using old data when the programmable logic controller is switched from a standby system to a control system without increasing the processing load of the control system in a case where the programmable logic controller is a master station that controls the slave station.

DESCRIPTION OF EMBODIMENT

Hereinafter, a programmable logic controller, a slave device, and a duplex system according to an embodiment of the present invention will be described in detail with reference to the drawings. Note that the present invention is not limited by this embodiment.

Embodiment

Figure 1:
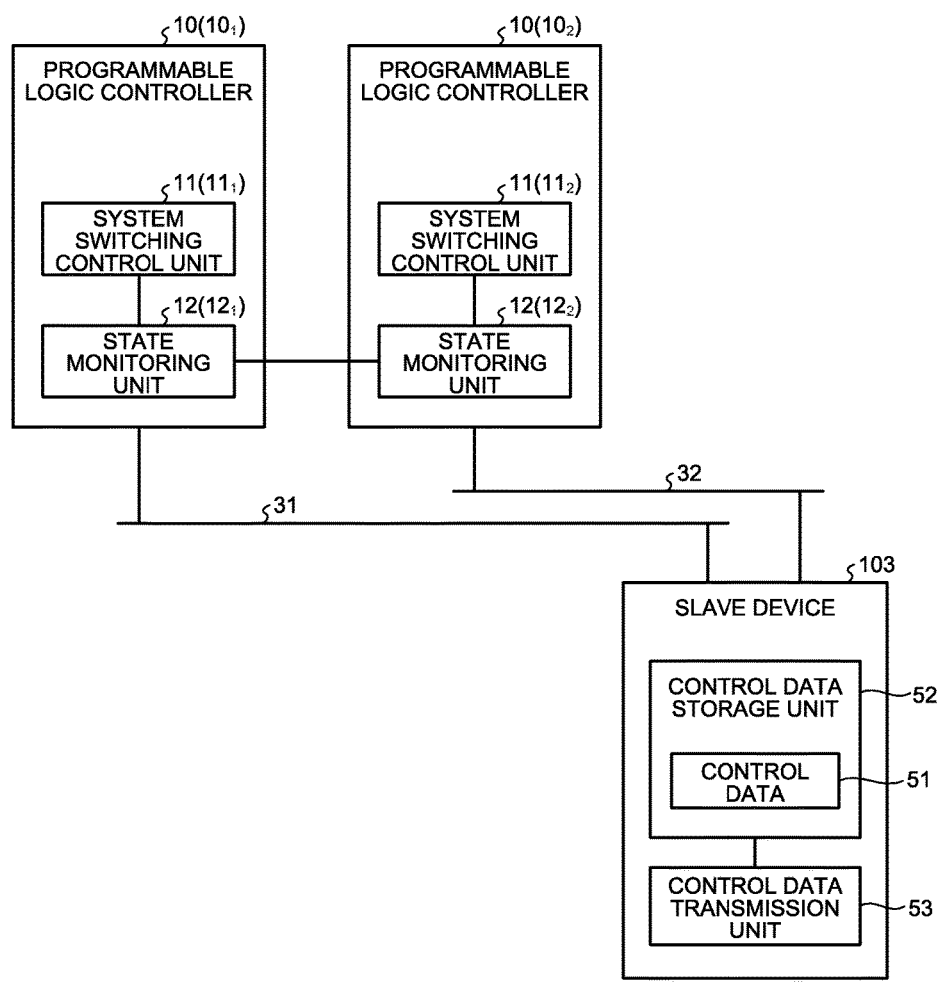
FIG. 1 is a diagram illustrating a configuration of a duplex system in which programmable logic controllers and a slave device are used according to an embodiment of the present invention.

FIG. 1 is a diagram illustrating a configuration of a duplex system in which programmable logic controllers and a slave device are used according to an embodiment of the present invention. A duplex system 100 includes programmable logic controllers $10_1$ and $10_2$, one of which is a control system and the other is a standby system; a slave device 103 controlled by one of the programmable logic controllers $10_1$ and $10_2$ functioning as the control system; a network 31, which connects the programmable logic controller $10_1$ to the slave device 103; and a network 32, which connects the programmable logic controller $10_2$ to the slave device 103. In the duplex system 100, the programmable logic controllers $10_1$ and $10_2$ are master stations that control the slave device 103, which is a slave station, and the slave device 103 is a slave station controlled by the programmable logic controllers $10_1$ and $10_2$, which are master stations. The programmable logic controllers $10_1$ and $10_2$ are duplicate controllers, and whichever is the control system controls the slave device 103, which is a slave station, by using control data received from the slave device 103. The slave device 103 means all devices that can be slave stations controlled by a master station, and is not limited to specific devices. Specific examples of the slave device 103 include a remote input/output unit and a head unit.

Note that the configuration of the programmable logic controller $10_1$ is the same as that of the programmable logic controller $10_2$. Therefore, in the following description, only when it is necessary to distinguish these two from each other, they are written as the programmable logic controllers $10_1$ and $10_2$ so that they are distinguished from each other. For the descriptions of common matters where these two do not need to be distinguished from each other, they are written as the programmable logic controllers 10. The subscript "1" or "2" is attached to the reference symbol of constituent elements in the programmable logic controllers described below only when it is necessary to distinguish between a constituent element of the programmable logic controller $10_1$ and a constituent element of the programmable logic controller $10_2$.

The programmable logic controller 10 includes a system switching control unit 11, which controls switching of the control system and the standby system; and a state monitoring unit 12, which monitors the state of the programmable logic controller 10 that is the counterpart in the duplication.

Figure 2:
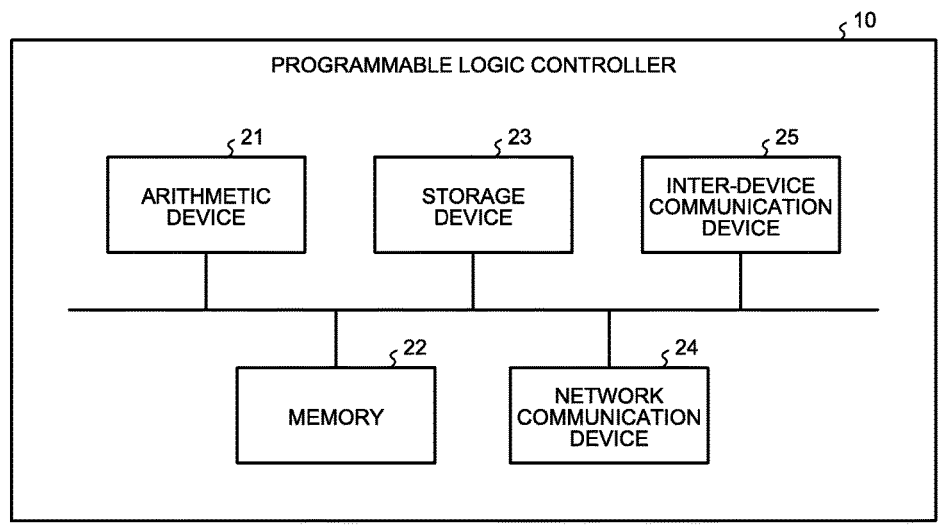
FIG. 2 is a diagram illustrating a hardware configuration of the programmable logic controller according to the embodiment.

FIG. 2 is a diagram illustrating a hardware configuration of the programmable logic controller according to the embodiment. The programmable logic controller 10 includes an arithmetic device 21, which executes a program; a memory 22 used as a work area by the arithmetic device 21; a storage device 23, which stores a program and data; a network communication device 24 for communicating with the slave device 103; and an inter-device communication device 25 for communications between the programmable logic controllers.

A central processing unit (CPU) can be used for the arithmetic device 21. A random access memory (RAM) can be used for the memory 22. A nonvolatile semiconductor memory can be used for the storage device 23. The system switching control unit 11 illustrated in FIG. 1 is implemented by the arithmetic device 21 executing software by using the memory 22 as a work area and communicating with the slave device 103 by using the network communication device 24. Furthermore, a plurality of arithmetic devices and a plurality of memories may cooperate with each other to execute the above functions. The state monitoring unit 12 illustrated in FIG. 1 is implemented by the arithmetic device 21 executing software by using the memory 22 as a work area and communicating with the programmable logic controller 10 that is the counterpart in the duplication by using the inter-device communication device 25. Furthermore, a plurality of arithmetic devices and a plurality of memories may cooperate with each other to execute the above functions.

Figure 3:
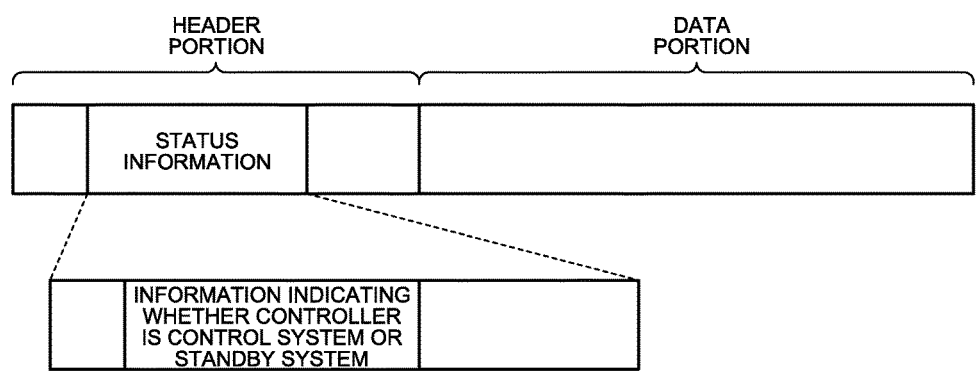
FIG. 3 is a diagram illustrating an example of a data configuration transmitted to a slave device by the programmable logic controller according to the embodiment.

A system switching control unit $11_1$ periodically transmits, to the slave device 103, status information S1 including information indicating whether the programmable logic controller $10_1$ is the control system or the standby system. A system switching control unit $11_2$ periodically transmits, to the slave device 103, status information S2 including information indicating whether the programmable logic controller $10_2$ is the control system or the standby system. FIG. 3 is a diagram illustrating an example of a data configuration transmitted to a slave device by the programmable logic controller according to the embodiment. The data transmitted to the slave device by the programmable logic controller includes a header portion and a data portion, and the header portion includes status information including information indicating whether the programmable logic controller is the control system or the standby system. Because the status information is included in the header portion, the slave device 103 can acquire the status information without looking through the data portion, and thus the processing load on the slave device 103 can be reduced.

As illustrated in FIG. 1, the slave device 103 includes a control data storage unit 52, which stores control data 51; and a control data transmission unit 53, which transmits the control data 51 to one of the two duplicate programmable logic controllers $10_1$ and $10_2$ functioning as the control system on the basis of the information included in the status information received from the programmable logic controllers 10.

Figure 4:
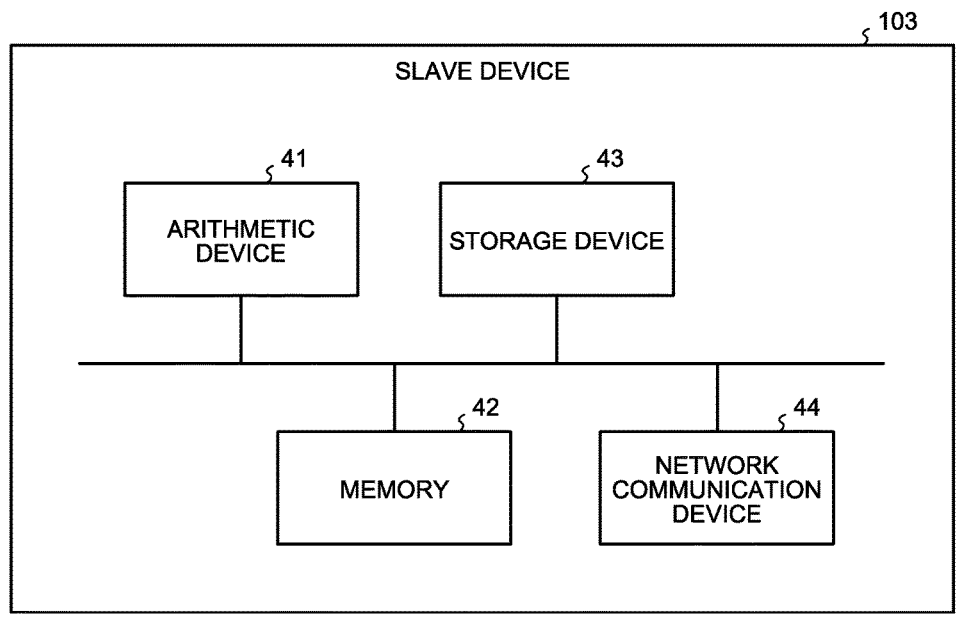
FIG. 4 is a diagram illustrating a hardware configuration of the slave device according to the embodiment.

FIG. 4 is a diagram illustrating a hardware configuration of the slave device according to the embodiment. The slave device 103 includes an arithmetic device 41, which executes a program; a memory 42 used as a work area by the arithmetic device 41; a storage device 43, which stores a program and the control data 51; and a network communication device 44 for communicating with the programmable logic controllers 10.

A CPU can be used for the arithmetic device 41. A RAM can be used for the memory 42. A nonvolatile semiconductor memory can be used for the storage device 43. The control data storage unit 52 illustrated in FIG. 1 is implemented by the storage device 43. The control data transmission unit 53 illustrated in FIG. 1 is implemented by the arithmetic device 41 executing software by using the memory 42 as a work area and communicating with the programmable logic controller 10 by using the network communication device 44. Furthermore, a plurality of arithmetic devices and a plurality of memories may cooperate with each other to execute the above functions.

Figure 5:
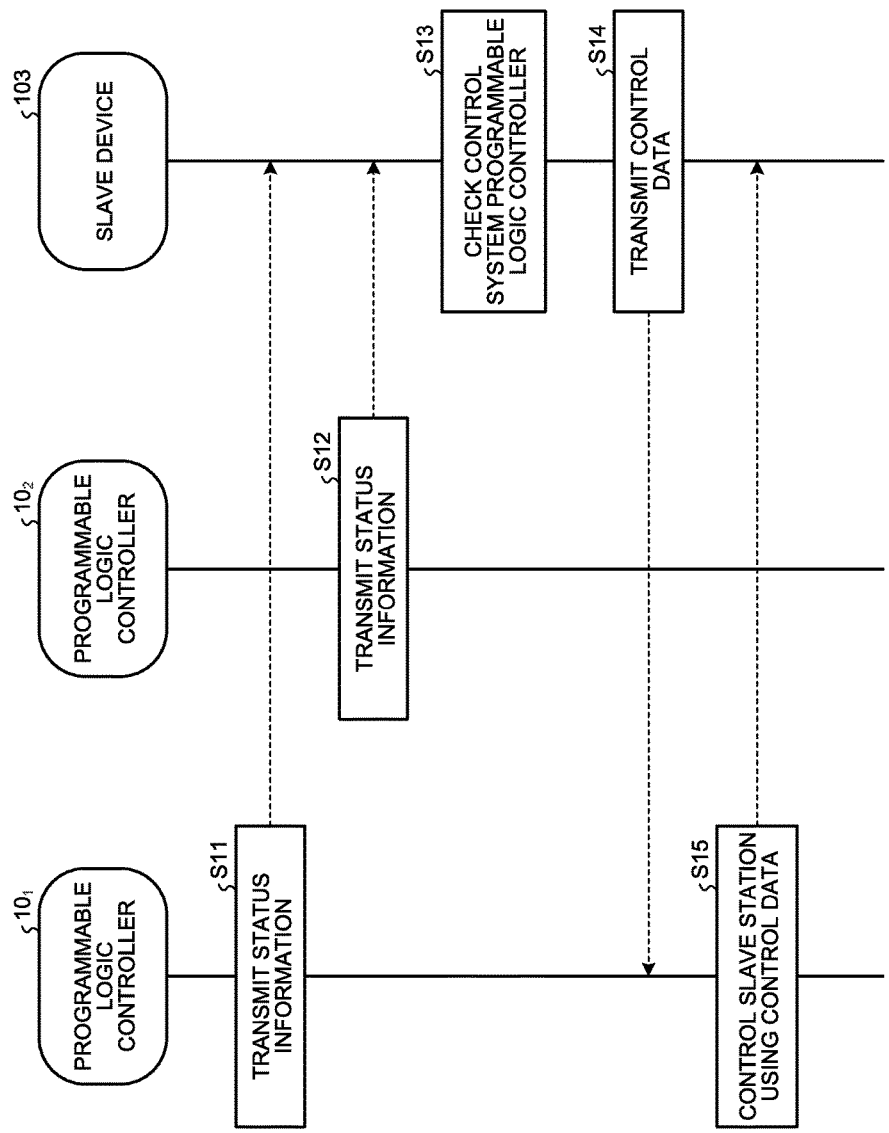
FIG. 5 is a sequence diagram illustrating a flow of an operation of the duplex system in which the programmable logic controllers are used according to the embodiment.

FIG. 5 is a sequence diagram illustrating a flow of an operation of the duplex system in which the programmable logic controllers are used according to the embodiment. Here, a case where the programmable logic controller $10_1$ is the control system is taken as an example, but an operation is performed in a similar manner in a case where the programmable logic controller $10_2$ is the control system. In step S11, the system switching control unit $11_1$ transmits status information to the slave device 103. In step S12, the system switching control unit $11_2$ transmits status information to the slave device 103. In step S13, the control data transmission unit 53 checks which one of the programmable logic controllers $10_1$ and $10_2$ is the control system. In step S14, the control data transmission unit 53 transmits control data to the programmable logic controller $10_1$ that is the control system. In step S15, the programmable logic controller $10_1$ controls the slave device 103 by using the control data received from the slave device 103.

When the programmable logic controller $10_2$ is the control system, the transmission destination of the control data in step S14 is the programmable logic controller $10_2$, and the programmable logic controller $10_2$ controls the slave device 103 in step S15.

Figure 6:
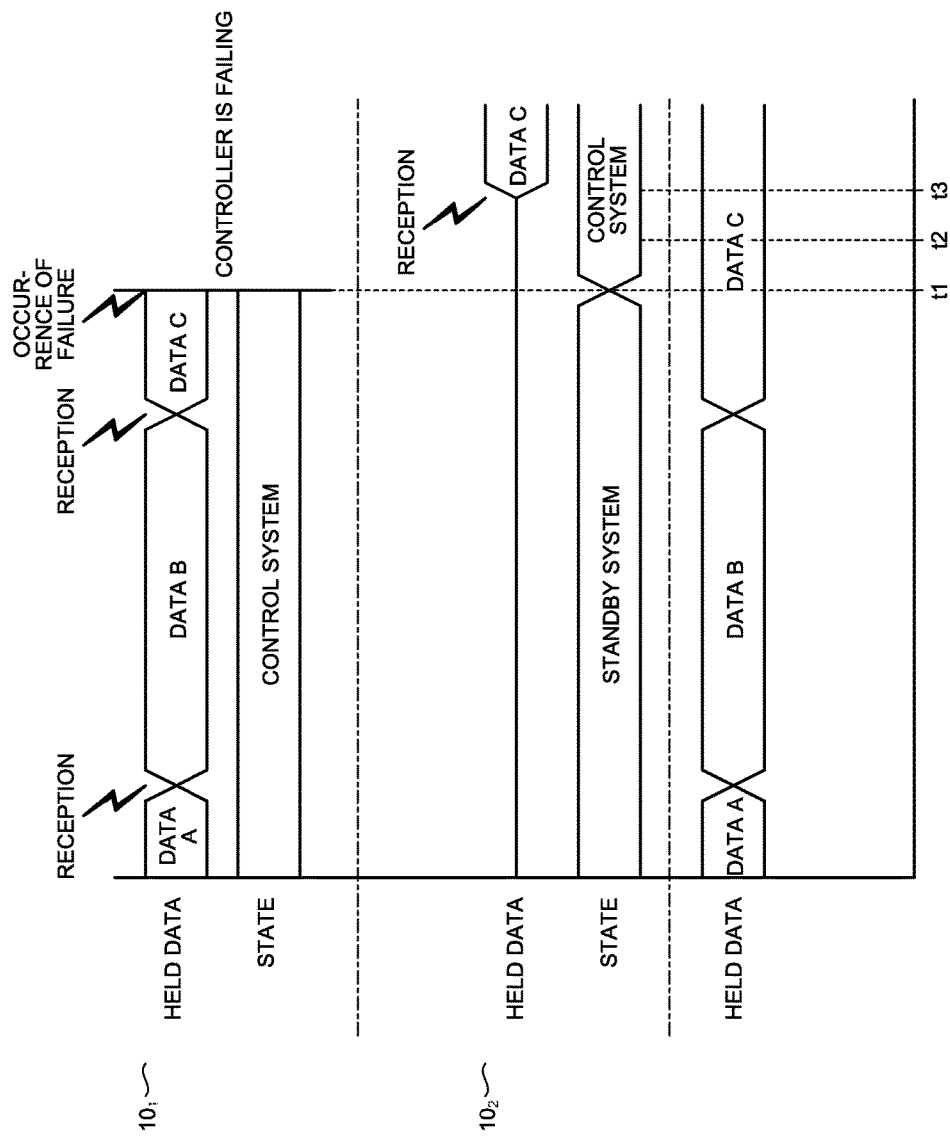
FIG. 6 is a timing chart when system switching is performed in the duplex system in which the programmable logic controllers are used according to the embodiment.

FIG. 6 is a timing chart when system switching is performed in the duplex system in which the programmable logic controllers are used according to the embodiment. At time t1, a failure occurs in the programmable logic controller $10_1$ that is controlling the slave device 103 by using data C, and the programmable logic controller $10_1$ cannot continue controlling the slave device 103. The state monitoring unit $12_1$ of the programmable logic controller $10_1$ detects the occurrence of the failure in the programmable logic controller $10_1$, and the system switching control unit $11_1$ switches the programmable logic controller $10_1$ from the control system to the standby system. In addition, the state monitoring unit $12_2$ of the programmable logic controller $10_2$ detects the occurrence of the failure in the programmable logic controller $10_1$, and the system switching control unit $11_2$ switches the programmable logic controller $10_2$ from the standby system to the control system.

At time t2, the system switching control unit $11_2$ transmits, to the slave device 103, status information S2 including information indicating that the programmable logic controller $10_2$ is the control system. At time t3, the system switching control unit $11_2$ receives, from the slave device 103, the data C, which is control data. Therefore, after time t3, the programmable logic controller $10_2$ controls the slave device 103 by using the data C.

The duplex system according to the embodiment includes the programmable logic controllers 10 each including the state monitoring unit 12, which monitors the state of the other programmable logic controller 10 that is the counterpart in the duplication, and the system switching control unit 11, which transmits, to the slave device 103, status information including information indicating whether the programmable logic controller is the control system or the standby system, which, in a case where the programmable logic controller is the control system, receives control data that is addressed to the programmable logic controller that is the control system and is transmitted from the slave device 103, and which, in a case where the programmable logic controller is the standby system, switches the programmable logic controller to the control system when hindrance in the other programmable logic controller is detected. In addition, the duplex system according to the embodiment includes the slave device 103 including the control data transmission unit 53, which receives, from both the two duplicate programmable logic controllers 10, status information including information indicating whether the programmable logic controller is the control system or the standby system, and which transmits control data to one of the two duplicate programmable logic controllers 10 functioning as the control system on the basis of the information included in the status information. Therefore, while control of the slave device 103 is normally performed, the processing load of the programmable logic controller 10 that is the control system is not increased. In addition, the programmable logic controller that has been switched from the standby system to the control system does not control the slave device by using old data.

By using the duplex system according to the embodiment for controlling a manufacturing facility, it is possible to prevent the occurrence of a manufacturing defect caused by a master station controlling a slave station by using old data and to improve the yield of products. In addition, it is possible to prevent failures in a manufacturing facility caused by a master station controlling a slave station by using old data and to realize a longer life of the manufacturing facility.

Figure 7:
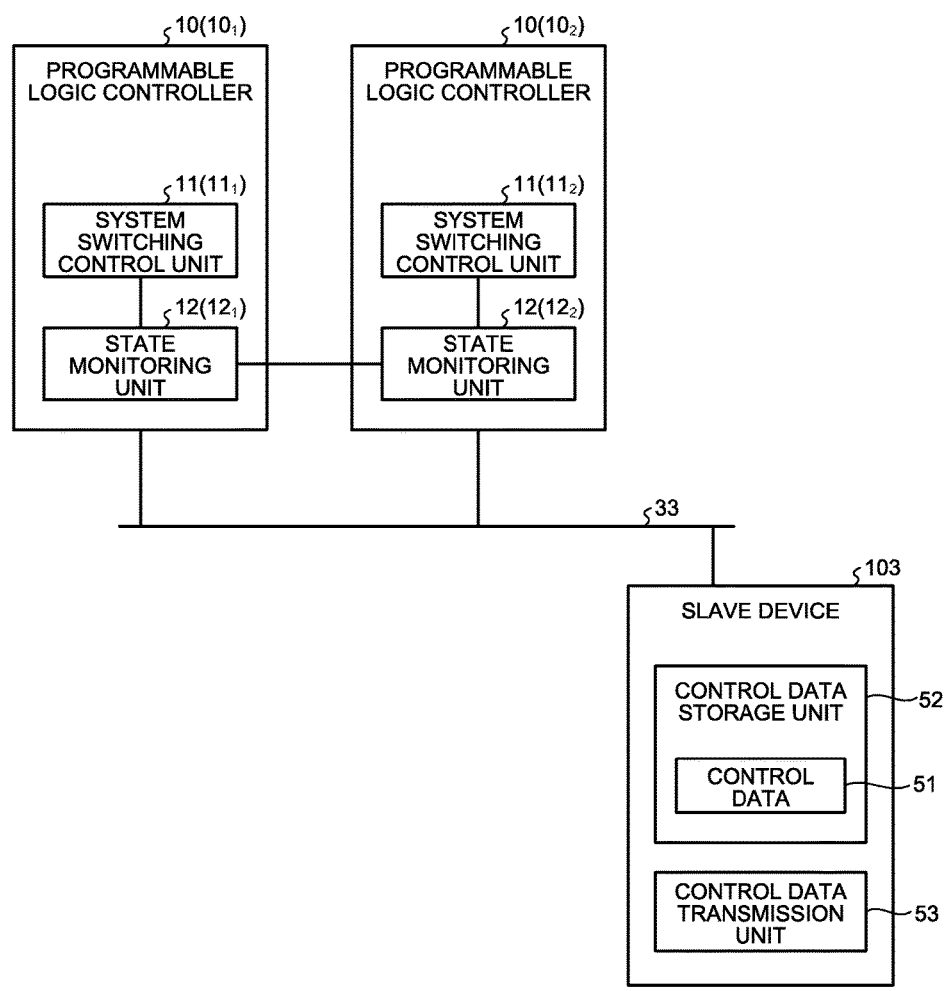
FIG. 7 is a diagram illustrating another configuration of a duplex system in which the programmable logic controllers and the slave device are used according to the embodiment.

In the above description, the duplicate programmable logic controllers $10_1$ and $10_2$ are connected to the slave device 103 via different networks 31 and 32, but the duplicate programmable logic controllers $10_1$ and $10_2$ may be connected to the slave device 103 via the same network. FIG. 7 is a diagram illustrating a configuration of a duplex system in which the programmable logic controllers are used according to the embodiment. The duplicate programmable logic controllers $10_1$ and $10_2$ are connected to the slave device 103 via the same network 33. Even when the duplicate programmable logic controllers $10_1$ and $10_2$ are connected to the slave device 103 via the same network 33, switching of the systems can still be made by performing a similar operation to that in the above description.

The configurations described in the above embodiment shows examples of the content of the present invention, and they can be combined with other known techniques and can be omitted or changed partially without departing from the gist of the present invention.

REFERENCE SIGNS LIST

10, $10_1$, $10_2$ programmable logic controller, 11, $11_1$, $11_2$ system switching control unit, 12, $12_1$, $12_2$ state monitoring unit, 21, 41 arithmetic device, 22, 42 memory, 23, 43 storage device, 24, 44 network communication device, 25 inter-device communication device, 31, 32, 33 network, 51 control data, 52 control data storage unit, 53 control data transmission unit, 103 slave device.

The invention claimed is:

1. A slave device controlled by one of two duplicate programmable logic controllers functioning as a control system on a basis of control data, the slave device comprising:
a control data transmitter configured to periodically receive, from each of the two duplicate programmable logic controllers, status information including information identifying the respective programmable logic controllers as the control system or a standby system, and to check which one of the two duplicate programmable logic controllers is the control system and to transmit the control data to only one of the two duplicate programmable logic controllers identified as the control system on a basis of the information included in the status information, wherein the information transmitted by one of the programmable logic controllers explicitly identifies the one programmable logic controller as the control system and the information transmitted by the other of the programmable logic controllers explicitly identifies the other programmable logic controller as the standby system.

2. A duplex system comprising:

a slave device controlled by one of two duplicate programmable logic controllers functioning as a control system on a basis of control data, the slave device comprising:

a control data transmitter configured to periodically receive, from each of the two duplicate programmable logic controllers, status information including information identifying the respective programmable logic controllers as the control system or a standby system, and to transmit the control data to only one of the two duplicate programmable logic controllers identified as the control system on a basis of the information included in the status information; and the two duplicate programmable logic controllers, each of which is configured to control the slave device by using the control data received from the slave device when functioning as the control system, wherein each of the duplicate programmable logic controllers includes:

a state monitor configured to monitor a state of the other duplicate programmable logic controller; and a system switching controller configured to transmit, to the slave device, the status information including information indicating whether the programmable logic controller is the control system or the standby system, to receive the control data that is addressed to the programmable logic controller functioning as the control system and is transmitted from the slave device after system switching in a case where the programmable logic controller functions as the control system, and to switch the programmable logic controller to the control system when hindrance in the other duplicate programmable logic controller is detected in a case where the programmable logic controller functions as the standby system.

3. The duplex system according to claim 2, wherein each of the programmable logic controllers transmits, to the slave device, the status information in a state included in a header portion of a frame.

* * * * *